Patented Oct. 14, 1924.

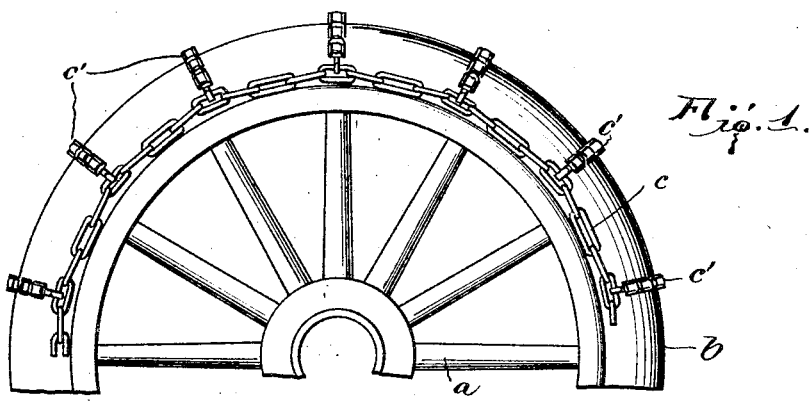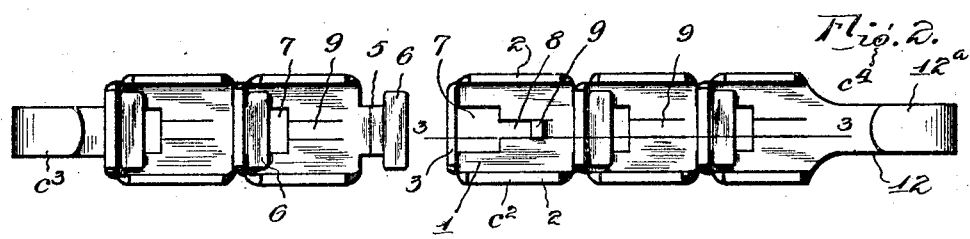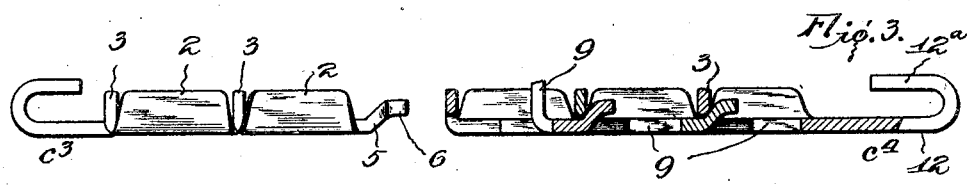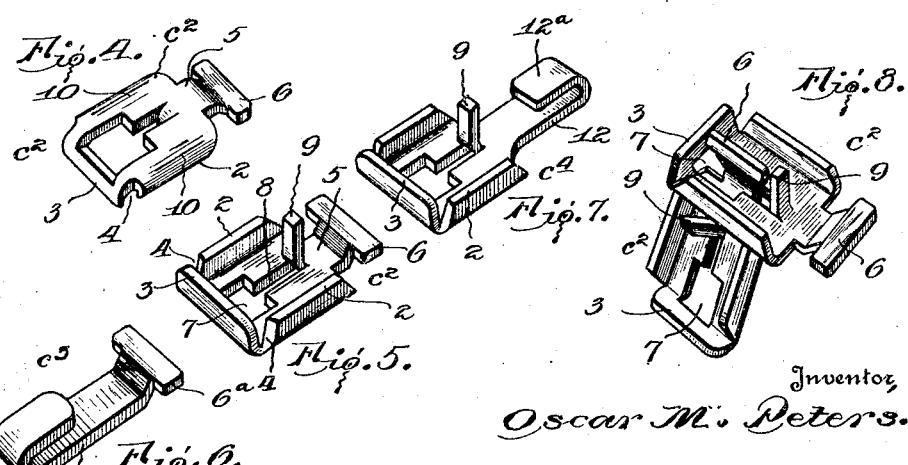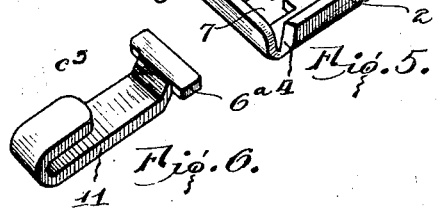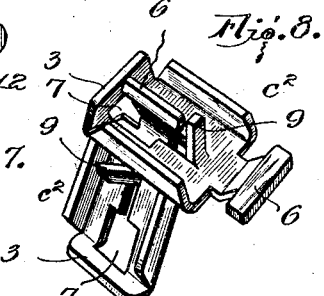

1,511,362

UNITED STATES PATENT OFFICE.

OSCAR M. PETERS, OF BALTIMORE, MARYLAND.

NONSKID CHAIN.

Application filed August 18, 1922. Serial No. 582,701.

*To all whom it may concern:*

Be it known that I, OSCAR M. PETERS, a citizen of the United States, residing at Baltimore, in the State of Maryland, have invented certain new and useful Improvements in Nonskid Chains, of which the following is a specification.

This invention relates to improvements in nonskid chains for the wheels of motor vehicles, and more particularly to the cross chains which are arranged at intervals between the side chains. One purpose of the present invention is to provide a cross chain with flanges or calks which will render the chains more effective for traction purposes than the chains commonly used and which will prevent side slipping of the wheels and assist in lifting the wheels out of wheel ruts.

Another purpose of the invention is to provide a cross chain having detachable links whereby when one of the links is worn it may be readily replaced by another link. Other objects of the invention are to provide a cross chain having links which are self-cleaning and which are less injurious to the tire than the cross chains in common use.

In the accompanying drawings:—

Fig. 1 is a side elevation of part of a pneumatic tired wheel showing a non-skid chain embodying my invention applied thereto.

Fig. 2 is a plan view of the outer side of the cross chain in two separate parts.

Fig. 3 is a side elevation of the same partly in longitudinal section on the line 3—3 of Fig. 2.

Fig. 4 is a rear perspective view of one of the cross chain links.

Fig. 5 is a front perspective view of the same.

Fig. 6 is a front perspective view of a hook for connecting one end of the cross chain to a side chain.

Fig. 7 is a similar view of a hook for connecting the other end of a cross chain to a side chain; and Fig. 8 is a perspective view of two links illustrating the manner of coupling and uncoupling the links.

Referring to Fig. 1 of the drawings $a$ represents a vehicle wheel, $b$ represents a resilient tire thereon, and a non-skid chain is shown at $c$ and $c'$, the letter $c$ indicating the side chains (only one of which is shown) and $c'$ representing the cross chains.

In Figs. 2 to 8 inclusive, wherein the elements which compose the cross-chain are shown in detail, $c^2$ indicates the links which compose the cross chain and $c^3$ and $c^4$ represent the hooks which connect the cross chain to the side chains. The links $c^2$ are formed from sheet metal of suitable thickness and these links are all alike in size and form. Each link, as shown, comprises a flat, substantially rectangular, body portion 1 having longitudinal side flanges 2 and a flange 3 at one of its ends. These flanges all project at the same side of the body portion and to the same height. The side flanges are separated from the end flange in order to leave gaps or openings 4 between the flanges through which dirt, snow, ice, etc., may pass instead of clogging in the corners between the flanges. Each link, at the end opposite the end flange, has a shank 5, narrower than the body of the link and which projects centrally from the end of the link and is offset in the same direction as the side and end flanges. A head 6, at the end of the shank, projects laterally at both sides of the shank. The body of the link is formed with a rectangular opening 7 adjacent the end flange 3, this opening being centrally located between the side flanges of the link and being slightly wider than the shank 5 and of less width than the head 6. A slot 8 extends longitudinally of the link from the opening 7 and in forming this slot the metal which is displaced is not severed from the link but is bent upwardly to form a tongue 9, which projects at the same side of the body as the flanges.

As shown best in Fig. 4, the rear side of the link, which rests against the tire when the chain is in use, is substantially flat, affording a large bearing surface against the tire and its longitudinal edges are rounded as shown at 10, in order to prevent the link from cutting the tire. The manner of connecting and disconnecting the links is illustrated in Fig. 8. In order to connect two links, the links are turned so that the head and shank of one link may pass through the opening 7 and slot 8, as clearly illustrated in Fig. 8 and the links are then turned with respect to one another so that the body portions will lie in the same plane. The head on the one link will then extend across the opening in the other link and interlock with the end flange on the latter link. In order to prevent accidental uncoupling of two connected links, the tongue 9 on one of the links is pressed down into the slot 8 and this tongue then prevents the head of the shank on the adjacent link from entering or passing through the slot in case the links become turned at such an angle to one another as to bring the head of one in line with the slot or in the position shown in Fig. 8. When it becomes desirable to uncouple two of the links the locking tongue may be pushed back into the position shown in Fig. 7 and the links can then be turned as shown in Fig. 8 and taken apart.

In order to connect the cross chain to the side chains, I provide the hook $c^3$ at one end of the cross chains and the hook $c^4$ at the other end. The hook $c^3$ comprises a flat metal strip of less width than the opening 7 in the links and having a head $6^a$, of greater length than the width of said opening, which head is offset from the body portion 11 of the hook in the same manner and to the same extent as the heads 6 are offset from the bodies of the links. The head and shank of the hook $c^3$ may be passed through the opening 7 and connecting slot 8 in a link, and then locked in place by pressing down the tongue on the link, as clearly shown in Fig. 2. The hook $c^4$ is formed in all respects like one of the links except that instead of having an offset shank and head, a strip 12 is extended from one end of the body and this strip is bent over upon itself, as shown at $12^a$ to form a hook for engaging the side chain. It will be evident that a link may be connected to the hook element $c^4$ in the same manner as the links are connected together.

The links are proportioned in length to suit tires of standard diameters so that a certain number of links will form a cross chain for a tire of one size and by adding or removing a definite number of links the cross chain will be of the exact length for a different size of tire.

In operation the side flanges on the links will prevent slipping of the wheels in the straight forward and backward movements of the vehicle and the end flanges will prevent side slipping of the wheels. The ordinary cross chain, the links of which are made from round rods, does not effectually prevent side slipping because the smooth surfaces of the links form runners under the wheels extending transversely of the line of travel whereas the end flanges on the cross chains of my invention form calks which resist lateral movement of the wheels. As the wheels rotate the cross chains are flexed while engaging the ground and resume an arcuate form after leaving the ground and the flexing and tightening of the links causes the tongues and shanks to move in the openings in the links and thus to throw out any dirt, ice or snow which might otherwise accumulate in the links. This clearing of the links is also facilitated by providing the notches between the flanges, which notches prevent the accumulation of material at the angles between the side and end flanges.

From the description heretofore given it will be evident that when one or more links of a cross chain are worn so as to unfit them for effective use they may be readily replaced by new links. Thus it is not necessary to discard the entire cross chain when a part of it is worn out. Furthermore, since the links are made in such multiples, with respect to the lateral diameters of the tires, that by assembling a proper number of these links the cross chains can be made of the correct lengths to fit tires of various standard diameters, it is not necessary for the dealer to carry a large stock of chains, but it is only necessary for him to carry a stock of links from which any length of cross chain can be assembled.

The links have a greater bearing surface on the tire than the ordinary form of link, and by reason of this greater bearing surface and also by reason of the rounding of the lateral edges of the links, the chains are less injurious to the tire than links made from round bar stock.

As the cross-chains extend laterally around the tire from side chain to side chain, and all of the links in the cross-chains are formed with the calks or flanges, it will be evident that when the operator is endeavoring to guide the wheels out of ruts, the cross-chain links at the sides of the tires will engage the sides of the ruts and materially assist in lifting the wheels out of the ruts.

What I claim is:

1. A non-skid cross-chain link comprising a relatively flat and substantially rectangular body having side flanges, a flange at one end, a shank projecting centrally from the opposite end, a head projecting laterally from the shank, an opening adjacent the end flange of greater width than the shank and of less width than the head and a tongue adapted to lock the head of a similar link in said opening.

2. A non-skid cross-chain link comprising a relatively flat and substantially rectangular body having side flanges, a flange at one end, a shank projecting centrally from the opposite end, a head projecting laterally from the shank, an opening adjacent the end flange of greater width than the shank and of less width than the head, a slot extending longitudinally of the body from said opening and a tongue adapted to close said slot.

3. A non-skid cross-chain link comprising a relatively flat and substantially rectangular body having side flanges, a shank projecting centrally from one end, a head projecting laterally from the shank, an opening adjacent the other end of greater width than the shank and of less width than the head, a slot extending longitudinally of the body from said opening and a tongue adapted to close said slot.

In testimony whereof I hereunto affix my signature.

OSCAR M. PETERS.